(12) United States Patent
Samaranayake et al.

(10) Patent No.: US 11,912,901 B1
(45) Date of Patent: Feb. 27, 2024

(54) POLYMER LATEX FOR MATTE FILMS

(71) Applicant: SWIMC LLC, Cleveland, OH (US)

(72) Inventors: Gamini S. Samaranayake, Cleveland, OH (US); Shailesh S. Shah, Cleveland, OH (US); Joseph J. Kestner, Cleveland, OH (US); Kimberly A. Koglin, Cleveland, OH (US); Tom Wendland, Cleveland, OH (US); Margaret Patterson, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 107 days.

(21) Appl. No.: 17/564,561

(22) Filed: Dec. 29, 2021

Related U.S. Application Data

(60) Provisional application No. 63/133,963, filed on Jan. 5, 2021.

(51) Int. Cl.
| | |
|---|---|
| *C09D 7/42* | (2018.01) |
| *B01J 13/14* | (2006.01) |
| *C09D 7/40* | (2018.01) |
| *C09D 7/65* | (2018.01) |
| *C09D 133/04* | (2006.01) |

(52) U.S. Cl.
CPC ............... *C09D 7/42* (2018.01); *B01J 13/14* (2013.01); *C09D 7/65* (2018.01); *C09D 7/69* (2018.01); *C09D 7/70* (2018.01); *C09D 133/04* (2013.01)

(58) Field of Classification Search
CPC ...................................................... C09D 7/42
See application file for complete search history.

(56) References Cited

U.S. PATENT DOCUMENTS

| | | | |
|---|---|---|---|
| 4,391,928 A * | 7/1983 | Herman | .................... C09D 7/42 |
| | | | 525/902 |
| 4,983,662 A | 1/1991 | Overbeek | |
| 7,829,626 B2 * | 11/2010 | Chiou | ................ C08G 18/6216 |
| | | | 525/50 |
| 8,900,669 B2 | 12/2014 | LaFleur et al. | |
| 11,572,489 B1 | 2/2023 | Krafcik et al. | |
| 2002/0103278 A1 | 8/2002 | Krajnik et al. | |
| 2010/0081764 A1 | 4/2010 | Ouzineb et al. | |
| 2019/0071540 A1 | 3/2019 | Bohling et al. | |
| 2019/0177554 A1 | 6/2019 | Bohling et al. | |
| 2020/0079973 A1 | 3/2020 | Wang et al. | |

FOREIGN PATENT DOCUMENTS

| | | |
|---|---|---|
| EP | 538571 A1 | 4/1993 |
| EP | 3448902 A1 | 1/2020 |
| JP | H05279617 A | 10/1993 |

OTHER PUBLICATIONS

J.E. McNutt, et al.; "Effective utilization of titanium dioxide", Apr. 4, 1988, American Paint & Coatings Journal, p. 46-67.

\* cited by examiner

*Primary Examiner* — Vickey Nerangis
(74) *Attorney, Agent, or Firm* — Honigman LLP

(57) ABSTRACT

A waterborne coating composition including a novel polymer latex and methods of preparing the polymer latex for the waterborne coating composition. The disclosed polymer latex, when incorporated into the waterborne coating composition, reduces gloss, and achieves a matte appearance without the need for and/or with reduced amounts of traditional inorganic matting additives. In one approach, the polymer latex disclosed herein includes latex particles having a core/shell arrangement configured to not only participate in film formation but also impact surface morphology of dried films to produce the low gloss coatings.

12 Claims, 1 Drawing Sheet

POLYMER LATEX FOR MATTE FILMS

CROSS-REFERENCE TO RELATED APPLICATION

Figure 1:
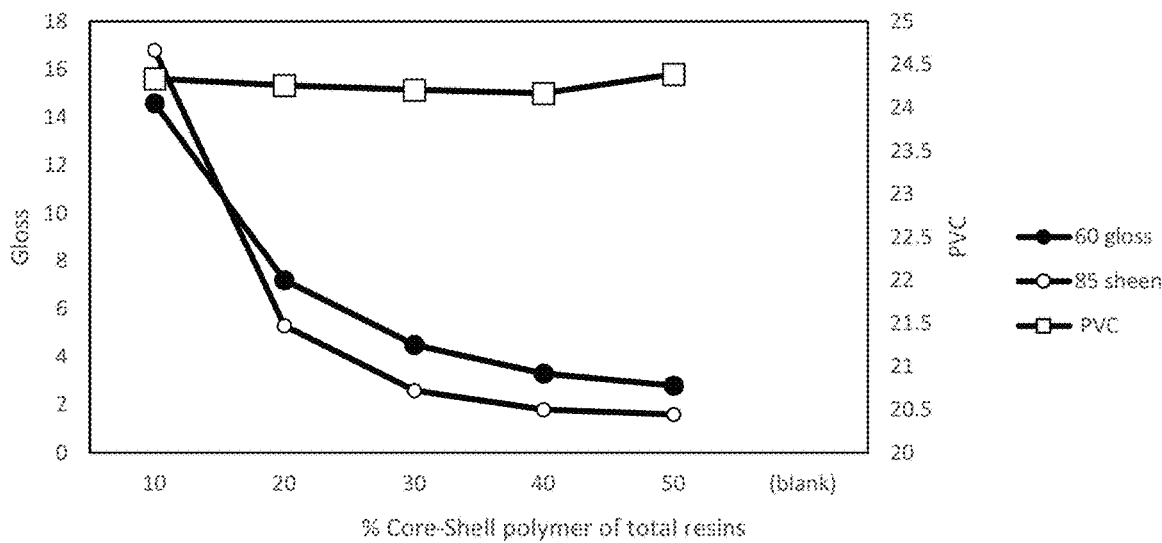

This application is a non-provisional application of and claims priority under 35 U.S.C. § 119 to U.S. Patent Application No. 63/133,963, filed Jan. 5, 2021. The entire contents of the aforementioned application is incorporated herein by reference.

FIELD

This application generally relates to compositions for low-gloss or matte coatings and, in particular, polymer latex compositions for low-gloss or matte films having a low pigment volume concentration (PVC).

BACKGROUND

Low gloss or matte coatings are desirable, in some instances, for their ability to minimize surface imperfections of a substrate and/or the coating covering the substrate. Traditionally, compositions for matte coatings control gloss through the addition of matting agents and/or mineral extenders.

Typically, matting agents or mineral extenders are inorganic particles of calcium carbonate, silica, and the like that tend to lower the specular reflection or maximize the diffuse reflection of a dried coating by increasing the surface roughness of the dried film. The overall roughness of the film increases light scattering, which in turn lowers the gloss of the film resulting in the matte appearance. Compositions for forming low gloss or matte films, therefore, commonly have a higher volume of pigment relative to binder in the compositions due to the presence of the matting agents or mineral extenders, and thus, a higher pigment volume concentration. While effective at reducing the gloss, however, the high volume of inorganic material in compositions for traditional matte coatings may be undesirable in some applications.

SUMMARY

In one aspect, a waterborne coating composition for producing at least a matte film is provided herein. In some approaches or embodiments, the waterborne coating composition includes a primary binder latex, organic particles having an average diameter of about 10 to about microns and including a polymeric core and polymeric shell and wherein the polymeric core has a glass transition temperature (Tg) of 80° C. or higher and the polymeric shell has a glass transition temperature (Tg) of 30° C. or less, a pigment volume concentration (PVC) of about 28 or less. In some approaches, the waterborne coating composition, when dried as a film, exhibits a gloss value of 5 or less and a 85-degree sheen value of 10 or less and with the polymeric shell combining with the primary binder latex to coalesce as the film and the polymeric core remaining as a particle within the dried film.

In other approaches or embodiments, the waterborne coating composition of the previous paragraph may be combined with optional features or embodiments in any combination. These optional features or embodiments may include any of the following: wherein the polymeric core is derived from reactants including styrene, methyl styrenes and other lower alkyl styrenes, chlorostyrene, vinyl toluene, vinyl naphthalene and divinyl benzene, methyl (meth)acrylate, hexanedioldiacrylate, tert-butyl(meth)acrylate, sec-butyl (meth)acrylate, ethylhexyl (meth)acrylate, butyl (meth)acrylate, chlorostyrene, vinyl toluene, vinyl naphthalene and divinyl benzene or combinations thereof; and/or wherein the polymeric shell is derived from reactants including alkyl(meth)acrylates, (meth)acrylic acid, vinyl acetates, acrylamides, alkyl amino (meth)acrylate, allyl (meth)acrylates, diacetone acryl amide, acetoacetyloxy ethyl(meth) acrylate, ethylhexyl(meth)acrylate, or combinations thereof; and/or wherein the polymeric core has an average particle diameter of about 6 to about 9 microns; and/or wherein the organic particles have a weight ratio of the polymeric core to the polymeric shell of about 90:10 to about 60:40; and/or wherein the PVC is about 15 to about 26; and/or wherein the waterborne coating composition includes about 20 to about 40 weight percent of the primary binder latex and about 2 to about 15 weight percent of the organic particle; and/or wherein the waterborne coating composition is essentially free of inorganic extender particles; and/or wherein the polymeric shell has a higher surface tension than a surface tension of the polymeric core; and/or wherein the organic extender particles have an interface between the polymeric core and the polymeric shell, and the polymeric shell diffuses at least partially into the polymeric core at the interface; and/or wherein the primary binder latex is selected from an acrylic latex, a vinyl acrylic latex, a styrene acrylic latex, or combinations thereof; and/or wherein the Tg of the polymeric core is between about 80° C. to about 100° C. and/or the Tg of the polymeric shell is between about 10° C. to about 15° C.

In other aspects, a method of preparing an aqueous suspension of organic particles having a core and shell is provided herein. In approaches, the method includes forming a pre-emulsion of one or more first monomers and an oil soluble free radical initiator in the presence of a colloidal dispersant, the one or more first monomers configured to form a polymer having a glass transition temperature (Tg) of about 80° C. or greater, homogenizing the pre-emulsion to form an emulsion having an average particle diameter of about 3 to about 12 microns, polymerizing the emulsion to form intermediate microsuspension of polymer particles having an average particle diameter of about 5 to about 12 microns, forming a second pre-emulsion with one or more second monomers having a surface tension greater than the surface tension of the intermediate polymer particles and configured to form a polymer having a glass transition temperature of about 30° C. or less, polymerizing the one or more second monomers of the second pre-emulsion in the presence of the intermediate polymer particles to form a polymeric shell at least partially surrounding the intermediate polymer particles and forming an aqueous suspension of organic particles having a core and shell; and wherein the organic particles have an average diameter of about 10 to about 50 microns.

In other aspects, the method of the previous paragraph may be combined with one or more optional features or embodiments. These optional features or embodiments may be one or more of the following: wherein the colloidal material includes polyvinyl alcohol, polyvinyl pyrrolidone, hydroxyethyl cellulose, hydroxyl propyl starch, or combinations thereof; and/or wherein the one or more first monomers include styrene, divinyl benzene, methyl(meth)acrylate, hexanedioldiacrylate, tert-butyl(meth)acrylate, sec-butyl (meth)acrylate, ethylhexyl (meth)acrylate, butyl (meth)acrylate, iso-bornyl (meth)acrylates or combinations thereof; and/or wherein the one or more second monomers include alkyl(meth)acrylates, (meth)acrylic acid, vinyl acetates, acrylamides, alkyl amino (meth)acrylate, allyl (meth)acrylates, diacetone acrylamide, acetoacetyloxy ethyl (meth)acrylate, ethylhexyl(meth)acrylate, or combinations thereof; and/or wherein the aqueous suspension of organic particles is combined with a primary binder latex to form a waterborne coating composition having a pigment volume concentration (PVC) of about 28 or less and the waterborne coating composition, when dried as a film, exhibits a 60-degree gloss value of 5 or less and an 85-degree sheen value of 10 or less and with the polymeric shell of the organic particles combining with the primary binder latex to coalesce as the film and the polymeric core of the organic particles remaining as a particle within the dried film; and/or wherein the waterborne coating composition includes about 20 to about 40 weight percent of the primary binder latex and about 2 to about 15 weight percent of the organic particles; and/or wherein the waterborne coating composition is substantially free of inorganic extender particles; and/or wherein the waterborne coating composition has a PVC of about 15 to about 26.

In yet other aspects, any embodiment of the method or waterborne coating compositions of this Summary may also be used or for use to prepare a matt film that exhibits a 60-degree gloss value of 5 or less and/or a 85-degree sheen value of 10 or less and/or with the polymeric shell combining with the primary binder latex to coalesce as the film and the polymeric core remaining as a particle within the dried film

FIGURES

Figure 2:
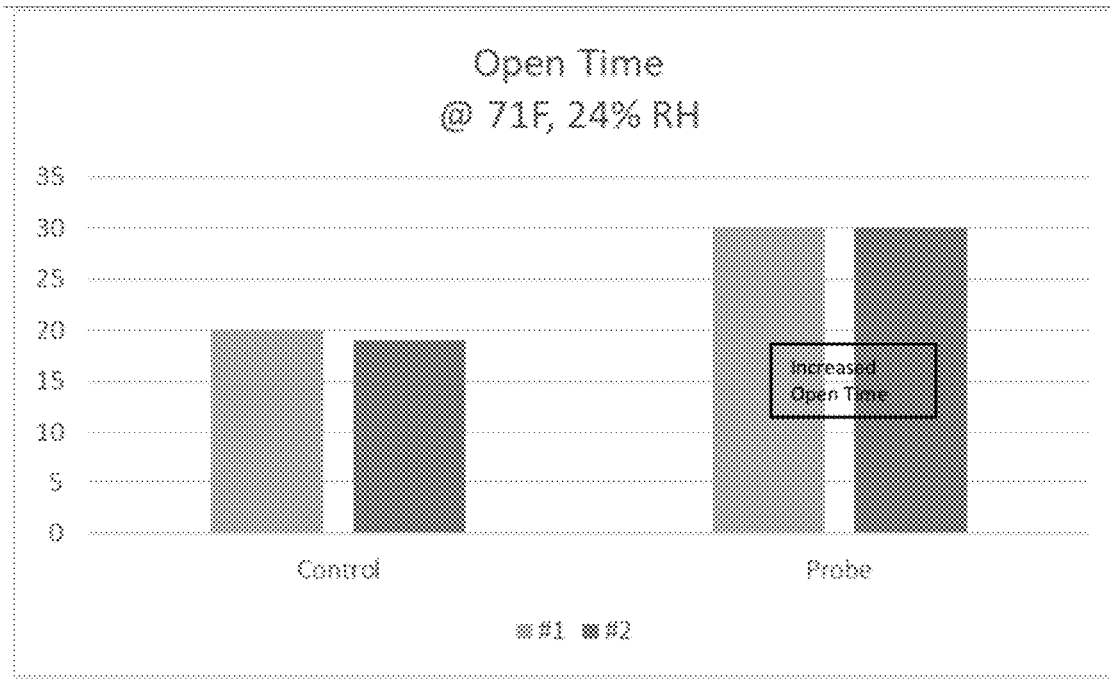

FIG. 1 is a plot of core-shell polymer percentage relative to gloss and pigment volume concentration; and FIG. 2 is a plot of open time.

DETAILED DESCRIPTION

The present disclosure provides a waterborne coating composition including an inventive polymer latex and methods of preparing the polymer latex for the waterborne coating composition. The polymer latex of the present disclosure, when incorporated into the waterborne coating composition including a primary film-forming binder, reduces gloss and achieves a matte appearance without the need for and/or with reduced amounts of traditional inorganic matting additives. In one approach or embodiment, the polymer latex disclosed herein includes latex particles having a core/shell arrangement configured to not only participate in film formation but also impact surface morphology of dried films to produce the low gloss coatings and, in approaches, without the matting or mineral extenders (or with reduced levels of such traditional matting agents).

In some approaches, the polymer latex disclosed herein includes a hard polymeric core covered or at least partially surrounded with a relatively thin layer of a film-forming, soft polymer. During coating film formation, the soft outer shell participates or coalesces with other film forming binder resins in the system (such as the primary latex binders described herein) to form a continuous matrix. The hard core, on the other hand, has a composition and size effective to impact the surface morphology of the dried coating thereby providing a surface roughness effective to minimize specular (mirror-like) reflection. The reduced specular effect will be a matte appearance achieved with less and/or substantially no (preferably essentially free of) matting agents, mineral extenders, or other prior additives that previously were needed in higher quantities to achieve low gloss matte coatings.

In some approaches, the polymer latex of the present disclosure includes organic particles having an overall or total average diameter of about 10 to about 50 microns of both the polymeric core and polymeric shell. In some aspects, the polymeric core has a glass transition temperature (Tg) of 80° C. or higher and the polymeric shell has a glass transition temperature (Tg) of 30° C. or less. Surprisingly, low gloss or matte coatings using such polymer latex can be achieved in a composition, in some embodiments, having a pigment volume concentration (PVC) of about 28 or less, about 26 or less, or even about 20 or less. In other approaches or embodiments, the coating compositions herein using the disclosed polymer latex has a PVC ranging from at least about 12, at least about 14, at least about 16, at least about 18, or at least about 20 to about 28 or less, about 26 or less, about 24 or less, about 22 or less, or even about 20 or less and suitable for flat extra white, flat deep, or flat ultra-deep bases. In one approach, when waterborne matte coating compositions including the core/shell latex polymers herein are dried as a film, the resulting films exhibit a 60-degree gloss value of 5 or less and/or an 85-degree sheen value of 10 or less with reduced amounts of and, in some approaches, substantially no inorganic mineral extenders or matting agents. In other approaches, the core/shell latex polymers herein can also be used in other paint or coating bases to produce intermediate grade gloss levels such as satin and eggshell finishes, without using a substantial amount of mineral binder, or using none, depending on the paint or coating base. As used herein, a paint or coating base is understood as a paint or coating formulation that may be pre-adjusted to produce a desired gloss level. If the core/shell latex polymers herein are used in a paint or coating base configured for satin or eggshell finishes, then when the formulations are dried as a film, the resulting films would exhibit a 60-degree gloss value of about 10 to about 25 units and/or an 85-degree sheen value of about 10 to about 35 units for an eggshell finish and a 60-degree gloss value of about 20 to about 35 units and/or an 85-degree gloss value of at least 35 for a satin finish. During film formation, the polymeric shell of the particles herein combine with a primary binder latex in the composition to coalesce as the film and the polymeric core remain as a substantially intact particle embedded or entrapped within the dried film to impact the surface roughness sufficient to achieve the desired gloss and sheen. In some approaches, the dried coatings of the compositions herein have a surface roughness of about 0.6 to about 6 microns. Surface roughness can be measured using a profilometer to determine the root mean square average roughness number in microns.

The core portion of the latex particles herein include a hard and stable polymer that does not participate in film formation and has an average diameter and composition effective to impact the surface roughness of the dried film to minimize specular reflection sufficient to achieve the matte appearance. The core is formed from reactants configured to form a polymer having a high glass transition temperature of about 80° C. or more and, in some approaches, about 80° C. to about 110° C., and in other approaches, about 80° C. to about 100° C. In some approaches, the core polymer also has a surface tension that is lower than the surface tension of the polymeric shell.

In some approaches, the polymeric core may be obtained from any reactants or monomers effective to achieve the desired high glass transition temperature and interface morphology with the shell polymer such that the polymeric core may be coated with the polymer forming the shell. In some approaches, the core is polymerized from high Tg monomers or reactants including one or more ethylenically unsaturated or vinyl monomers such as styrene, divinyl benzene, linear or branched alkyl(meth)acrylate (such as C10 or lower alkyl (meth)acrylates), hexanediol di(meth)acrylate, tert-butyl (meth)acrylate, sec-butyl (meth)acrylate, ethylhexyl(meth) acrylate, butyl (meth)acrylate, and the like, or combinations thereof. In optional approaches, the core polymer is prepared from aromatic monomers and, in some approaches, a mixture of monomers providing aromatic pendant groups and aromatic backbone groups to achieve the desired high glass transition temperatures of the core. In approaches, the core polymer is obtained from reactants including about 70 to about 90 weight percent of high Tg monomers such as styrene, methyl methacrylate, tertiary butyl methacrylate, iso-butyl methacrylate, bornyl acrylate, cyclohexyl methacrylate adamantyl methacrylate and about 10 to about 30 weight percent of co-monomers such as divinyl benzene, hexane diol dimethacrylate, butnediol diacrylate trimethylol propane triacrylate, suitable alkylene glycol di(meth)acrylates, or combinations thereof. The co-monomers may be polymerized within the backbone with pendant side chains for crosslinking in some approaches, and in other approaches may be used as long as the noted glass transition and surface morphology (surface tensions) is maintained for the core portion of the formed particle.

The polymer particle forming the core has an average diameter of about 5 to about 20 microns, in other approaches, about 6 to about 15 microns, about 6 to about 12 microns, and yet other approaches, about 6 to about 9 microns. Such core particle size is sufficient to impact the surface roughness of a formed film such that the dried coating has a surface roughness of about to about 6 microns. Surface roughness is measured using a profilometer.

In one approach, the polymeric core of the latex polymer particles herein is produced using microsuspension polymerization using a colloidal suspending agent as discussed further below. Polymerization proceeds first with the formation of a mixture including the colloidal suspending agent, then a coarse emulsion of the core monomers, followed by homogenizing the coarse emulsion to form a microsuspension or 2 of the core monomers to a target particle size in the emulsion (in some approaches, an emulsion size of about 5 to about 12 microns), and then polymerizing the microsuspension. Expected weight average molecular weights of the emulsion polymers would be about 40,000 to about 1,000,000.

The shell of the core-shell latex particles herein is a soft and film-forming polymer that coalesces with other binder polymers of the waterborne coating composition to participate in film formation. The shell polymer is formed from reactants configured to form a polymer having a glass transition temperature of about 30° C. or less and, in some approaches, about 10° C. to about about 10° C. to about 20° C., and in other approaches, about 10° to about 15° C. In approaches, the shell has a difference in glass transition temperature relative to the core ranging from about a to about 90° C. difference to about a 50° C. to about 70° C. difference. The shell polymer also exhibits a surface tension that is greater than the surface tension of the polymeric core enabling this polymer to coat and/or at least partially surround the core particle. In approaches herein and when in an aqueous medium where water has a higher surface energy/tension than the components in the medium, the surface tension of the shell polymer is higher than the surface tension of the core polymer; otherwise, the shell components will migrate into the core in an attempt to get as far from the continuous water phase as possible.

In some approaches, the polymeric shell may be obtained from any alicyclic or aliphatic reactants or monomers effective to achieve the desired low glass transition temperature and interface morphology (surface tension) in the context of a core-shell polymer such that the polymeric core may be coated with the polymeric shell. In approaches, the shell is derived from low Tg reactants including one or more ethylenically unsaturated or vinyl monomers such as alkyl (meth)acrylates, (meth)acrylic acid, vinyl acetates, acrylamides, alkyl amino (meth)acrylate, allyl (meth)acrylates, diacetone acrylamide, acetoacetyloxy ethyl(meth)acrylate, ethylhexyl (meth)acrylate, or combinations thereof. In approaches, the shell polymer is obtained from reactants including about 30 to about 50 weight percent of short chain alkyl(meth)acrylate monomers having an alkyl group of C4 or less (such as butyl (meth)acrylate, ethyl (meth)acrylate, methyl(meth)acrylate, or combinations thereof), about 50 to about 60 weight percent of long chain alkyl(meth)acrylate monomers having an alkyl group of C6 to C10 carbons (such as hexyl (meth)acrylate, ethylhexyl(meth)acrylate, and combinations thereof), and optionally less than 1 weight percent of acid functional monomers such as (meth)acrylic acid. The other monomers noted above may also be polymerized within the backbone forming the shell polymer as long as the noted glass transition and surface morphology (surface tensions) is maintained.

The size of the polymer shell formed on the latex particles herein is not particularly limited, but the amount of shell polymer is sufficient to participate in the film formation with the other film forming binders of the coating compositions herein. In some approaches, the shell of the polymer latex particles herein have a radial dimension or size of about 0.25 microns to about 1.5 microns, about 0.4 microns to about 0.6 microns, or about 0.3 microns to about 0.4 microns.

The shell polymer is formed about the core using semi-continuous feeding of the monomer mixture for a time sufficient to form the desired thickness of polymer shell. In some approaches, the core-shell latex particles have a weight ratio of the polymeric core to the polymeric shell of about 90:10 to about 60:40 and the shell polymer has a higher surface tension than a surface tension of the polymeric core.

In some approaches, the core-shell polymer particles herein have an interface between the polymeric core and the polymeric shell, and the polymers of the polymeric shell diffuses at least partially into the polymeric core at the interface. In some embodiments and not wishing to be limited by theory, it is expected that covalent bonding between the core polymer and the shell polymer would be possible but limited; however, there may be physical bonding, such as diffusion and/or entanglement of the polymers in-situ after migration into the formed core.

The waterborne coating compositions herein may also include a primary binder or film-forming polymer in addition to the disclosed core-shell polymer latex described above. In one embodiment or approach, the primary binder may be acrylic polymers or copolymers prepared from ethylenically unsaturated or vinyl monomers such as one or more of alkyl (meth)acrylate monomer units, vinyl acetate monomer units, styrene monomer units, ketone-functional vinyl monomer units, and the like, or combinations thereof. In some approaches, the primary binder has a glass transition temperature of about 0° C. to about 100° C. (in other approaches, about 10° C. to about 90° C., about 20° C. to about 80° C., about 20° C. to about 70° C., about 20° C. to about 30° C., about 10° C. to about 30° C., about 10° C. to about 20° C., or about 10° C. to about 15° C.)

In some approaches, the primary binder is an acrylic, styrene acrylic, or vinyl acrylic polymer or copolymer and/or blends thereof including ethylenically unsaturated monomers with at least carboxylic acid, alkyl acrylate, alkyl methacrylate, or acetate moieties. The copolymer may include as polymerizable units in a polymer backbone vinyl monomers and acrylic monomers such as at least vinyl acetate, alkyl acrylate, alkyl methacrylate, acrylic, styrene acrylic, and combinations thereof. Alkyl groups of the monomers may have linear or branched chain lengths from C1 to C8 and, in some approaches, are ethyl, propyl, isopropyl, butyl, ethylhexyl, and the like side groups.

In some approaches, vinyl monomers are selected from the group consisting of vinyl esters, vinyl aromatic hydrocarbons, vinyl aliphatic hydrocarbons, vinyl alkyl ethers and mixtures thereof. Examples of vinyl esters that may be used include vinyl acetate, vinyl propionate, vinyl laurate, vinyl pivalate, vinyl nonanoate, vinyl decanoate, vinyl neodecanoate, vinyl butyrates, vinyl benzoates, and vinyl isopropyl acetates. Examples of vinyl aromatic hydrocarbons that may be used include styrene, methyl styrenes and other lower alkyl styrenes, chlorostyrene, vinyl toluene, vinyl naphthalene and divinyl benzene. Examples of vinyl aliphatic hydrocarbons that may be used include vinyl chloride and vinylidene chloride as well as alpha olefins such as ethylene, propylene, isobutylene, as well as conjugated dienes such as 1,3 butadiene, methyl-2-butadiene, 1,3-piperylene, 2,3-dimethyl butadiene, isoprene, cyclohexene, cyclopentadiene, and dicyclopentadiene. Examples of vinyl alkyl ethers that may be used include methyl vinyl ether, isopropyl vinyl ether, n-butyl vinyl ether, and isobutyl vinyl ether.

Acrylic monomers suitable for use in the present compositions may include any compounds having acrylic functionality. Suitable acrylic monomers are selected from the group consisting of alkyl (meth)acrylates, acrylic acids, as well as aromatic derivatives of (meth)acrylic acid, acrylamides, acrylonitrile, or combinations thereof. Typically, the alkyl (meth)acrylate monomers (also referred to herein as "alkyl esters of (meth)acrylic acid") will have an alkyl ester portion containing from 1 to 12, in some approaches, about 1 to 8, in yet other approaches, about 1 to 6, and in yet further approaches, 1 to 4, carbon atoms per molecule.

Suitable acrylic monomers in the primary binder include, for example, methyl (meth)acrylate, ethyl (meth)acrylate, butyl (meth)acrylate, propyl (meth)acrylate, 2-ethylhexyl (meth)acrylate, cyclohexyl (meth)acrylate, decyl (meth)acrylate, isodecyl (meth)acrylate, benzyl (meth)acrylate, isobornyl (meth)acrylate, neopentyl (meth)acrylate, 1-adamatyl methacrylate and various reaction products such as butyl, phenyl, and cresyl glycidyl ethers reacted with (meth)acrylic acid, hydroxyl alkyl (meth)acrylates, such as hydroxyethyl and hydroxypropyl (meth)acrylates, amino (meth)acrylates, as well as acrylic acids such as (meth) acrylic acid, ethacrylic acid, alpha-chloroacrylic acid, alpha-cycanoacrylic acid, crotonic acid, beta-acryloxy propionic acid, and beta-styryl acrylic acid.

In some approaches, the acrylic polymer of the primary binder may include substantial amounts of a vinyl acetate monomer. The acrylic copolymer may also include about 90 to about 100 weight percent of linear or branched alkyl acrylate or alkyl methacrylate monomer, and in other approaches, about 94 to about 100 weight percent of a linear or branched alkyl acrylate or alkyl methacrylate monomer. In some approaches, the copolymer may further include substantial amounts of acrylic acid monomer.

The primary binder may also include optional ketone-functional vinyl monomer units. In some approaches, these monomer units may be derived from diacetone acrylamide, diacetone (meth)acrylamide, acetoacetoxyethyl (meth)acrylate, acrolein, methacrolein, vinyl acetoacetate, crotonaldehyde, 4-vinylbenzaldehyde, vinyl alkyl ketones, acrylamidopivalaldehyde, methacrylamidopivalaldehyde, 3-acrylamidomethyl-anisaldehyde, diacetoneacrylate, acetonyl acrylate, diacetone methacrylate, acetoacetoxyethylmethacrylate, 2-hydroxypropylacrylate acetylacetate, and butanediolacrylate acetylacetate and the like, and combinations thereof.

In some approaches, the primary binder may include about 0 to about 20 weight percent of the optional ketone-functional monomer units, and in other approaches, about 0 to about 12 weight percent, and in yet other approaches, about 1 to about 16 weight percent or 2 to about 12 weight percent as a percentage of the acrylic phase.

The primary binder, the core, or the shell of the compositions herein may also include other optional monomers polymerized into the polymer backbone as needed for a particular application. For instance, the copolymer may further include ureido monomers, amino monomers, sulfonate monomers or surfactants, silane monomers, phosphate monomers or surfactants, carboxyl monomers or surfactants, and combinations thereof. In some approaches, the copolymer may further include vinyl monomers such as allyl imidazolidinone, allyl acetoacetates, allyl epoxies, epoxy acrylates, carbonyl monomers, other sulfonates, other phosphonates, vinyl phosphonate, allyl hydroxypopyl sodium sulfonate, allyloxy hydroxypropyl sodium sulfonate, and combinations thereof as needed for a particular application. In some approaches, for instance, the other monomers may each be present in the acrylic copolymer in amounts up to about 10 weight percent, and in other approaches, about 0.1 to about 5 weight percent, in other approaches, about 0.5 to about 2 weight percent, but the amounts may vary depending on the particular application. In other approaches, the other or additional monomers may each be included in the polymer backbone in amounts less than about 1 weight percent.

The coating compositions herein, in some approaches, may have about 2 to about 16 percent of the core-shell polymer and about 2 to about 16 percent of the primary latex binder with little to no mineral extenders (such as about 0.2 percent or less of the mineral extenders, and preferably free of the mineral extenders). In other approaches, the compositions herein may include about 2 to about 9 weight percent of the core-shell polymer and about 9 to about 16 percent of the primary latex binder. With such amounts of the core-shell polymer, the compositions herein, when dried as a film producing a matte finish, have a low gloss or matte appearance with a 60-degree gloss value of less than about 5 and an 85-degree gloss value of less than about 10.

The core/shell polymer latex disclosed herein is produced through a first stage of microsuspension polymerization using a colloidal stabilizer or suspending agent to form the core and then forming a second stage around the core by semi-continuous feeding of a mixture of monomers to form the shell. In the microsuspension polymerization, the first step of developing reaction conditions is to form a stable monomer emulsion of the target particle size (such as about 5 to about 12 microns, and in other approaches, about 5 to about 8 microns). A colloidal stabilizer solution may be used to aid in achieving the desired target emulsion size. Suitable colloidal stabilizers may be polyvinyl alcohol, polyvinyl pyrrolidone, hydroxyethyl cellulose, hydroxy propyl starch, or combinations thereof. High-speed homogenization may be employed to achieve the target particle size of the microemulsion monomer emulsion. Polymerization of the monomer emulsion to form microsuspension of the core in the first stage then proceeds for a time and temperature to achieve the targeted particle size of the polymeric core. Then, in a second stage using conventional seeded emulsion polymerization of the polymeric microsuspension with the shell monomers proceeds to make the core-shell latex particles. Further details of the polymerization are provided below and in the Examples herein.

In some approaches, for instance, the first polymerization stage includes a first or core monomer mixture formed with the selected core monomers and an oil soluble free radical initiator and is dispersed in an aqueous medium combined with the colloidal stabilizer and homogenized. The core monomer emulsion is then placed in the reactor and is heated to a reaction temperature, generally in a range from about 70° C. to about 90° C. The reaction is generally carried out over a period of time from about 2 hours to about 6 hours, usually between about 2 and about 3.5 hours. The resulting microsuspension comprising the core polymer is retained in the reactor for the second stage. Other suitable microsuspension or microemulsion suspension polymerization methods may also be used as appropriate.

For the second stage of shell polymer formations, a pre-emulsion of the shell monomer mixture is prepared by mixing it with an aqueous medium containing surfactant. In a separate vessel, a free radical initiator mixture comprising the initiator and an aqueous medium is formed. In the second stage, the pre-emulsion of the second monomer mixture is added to the microsuspension of core polymer particles in the reactor over a brief period of time, generally up to about 3 hours. The second initiator mixture is then added to the reactor and the reaction is allowed to proceed for generally about an hour. At the end of the second stage of the emulsion polymerization forming the shell about the core polymer, a neutralizing agent or base may be added to the dispersion to neutralize and at least swell the shell polymer. Suitable bases include ammonia, triethylamine, monoethanolamine, dimethylaminoethanol, ammonium hydroxide, and Group IA and Group IIA hydroxides, such as sodium hydroxide and potassium hydroxide. Based on the equivalents of acid in the shell polymer, 0.01 to 1.5 equivalents of base may be added. Other suitable polymerization methods may also be used as appropriate.

In some approaches, the core-shell polymerization and or the primary latex binder polymerization may be formed by free radical emulsion or microsuspension polymerization. The aqueous media used in the polymerization of the core-shell polymer and in the polymerization of the primary latex binder polymer may include water and, in some approaches, a surfactant. Suitable surfactants include anionic surfactants such as sodium lauryl sulfate, sodium tridecylether sulfate, diester sulfosuccinates and sodium salts of alkyl aryl polyether sulfonates; and nonionic surfactants such as alkyl aryl polyether alcohols and ethylene oxide condensates of propylene oxide, propylene glycol adducts.

In the polymerization of the core-shell polymer and/or the primary binder polymer, the initiator may be used in an amount sufficient to catalyze the polymerization reactions. This amount will typically vary from about 0.01 to 3 weight percent based on the weight of monomers charged. However, the concentration of the initiator is preferably from about 0.05 to about 2 weight percent and, more preferably, from about 0.1 to about 1 weight percent of the monomers charged. The particular amount used in any instance will depend upon the specific monomer mixture undergoing reaction and the specific initiator employed, which details are known to those skilled in the art. Suitable initiators that may be used in the polymerization of the core-shell polymer and in the polymerization of the primary binder polymer include, but are not limited to, hydrogen peroxide, peracetic acid, t-butyl hydroperoxide, di-t-butyl hydroperoxide, dibenzoyl peroxide, benzoyl hydroperoxide, 2,4-dicholorbenzoyl peroxide, 2,5-dimethyl-2,5-bis(hydroperoxy) hexane, perbenzoic acid, t-butyl peroxypivalate, t-butyl peracetate, dilauroyl peroxide, dicapryloyl peroxide, distearoyl peroxide, dibenzoyl peroxide, diisopropyl peroxydicarbonate, didecyl peroxydicarbonate, dicicosyl peroxydicarbonate, di-t-butyl perbenzoate, 2,2'-azobis-2,4-dimethylvaleronitrile, ammonium persulfate, potassium persulfate, sodium persulfate, sodium perphosphate, azobisisobutyronitrile, as well as any of the other known initiators. Also useful are the redox catalyst systems such as sodium persulfate-sodium formaldehyde sulfoxylate, cumene hydroperoxide-sodium metabisulfite, hydrogen peroxide-ascorbic acid, and other known redox systems. Moreover, as known by those skilled in the art, traces of metal ions can be added as activators to improve the rate of polymerization, if desired.

The waterborne coating compositions of the present disclosure may also include optional opacifying pigments. If included, suitable pigment particles or inorganic particles used in the polymer compositions or complexes or the water-borne coating composition of the present disclosure may be titanium dioxide ($TiO_2$), zinc oxide ($ZnO_2$), calcium carbonate ($CaCO_3$), talc, clay materials, aluminum oxide, silicon dioxide, magnesium oxide, zinc sulfate, combinations thereof, or other known pigment or inorganic particles suitable for paints and other coatings. In some approaches, the pigment or inorganic particle is titanium dioxide, which may comprise anatase titanium dioxide or rutile titanium dioxide, or a mixture of the two. In other approaches, the pigment or inorganic particle comprises rutile titanium dioxide, to the exclusion of anatase titanium dioxide. In some approaches, the rutile titanium dioxide is surface treated with an inorganic oxide, such as silica ($SiO_2$). Generally, the opacifying pigments, such as titanium dioxide, have a particle size less than a micron, such as about 0.2 to about 0.3 microns in diameter and provided in powder form, or in an aqueous slurry. An example of a titanium dioxide that is suitable for use is Ti-Pure® R-706, which is commercially available from E.I. du Pont de Nemours and Company. Ti-Pure® R-706 titanium dioxide is a rutile titanium dioxide that is surface treated with silica. In some approaches, the waterborne compositions herein may include about 10 to about 30 weight percent of titanium dioxide, about 15 to about 20 weight percent, or about 18 to about 25 weight percent of titanium dioxide.

As discussed above, the water-borne coating compositions herein preferably require little to no inorganic or mineral extender matting agents such as calcium carbonate, silicates, diatomaceous earth, clay, asbestine, barytes, silica, mica, and microspheres (glass, ceramic, or polymeric, and can be filled or hollow) to achieve a low gloss or matte appearance. Waterborne compositions built on the core/shell polymers disclosed herein preferably are substantially free of such inorganic matting agents and/or extenders, and the compositions may include about 1 weight percent or less, in other approaches, less than about 0.5 weight percent, in other approaches, less than about 0.2 weight percent, and in yet other approaches, no inorganic matting agents and extenders. Preferably, waterborne compositions built on the core/shell polymers disclosed herein are substantially free of or essentially free of such inorganic matting agents and extenders. Such mineral extenders or matting agents have particle sizes of about 1 micron or larger.

The water-borne coating compositions of the present disclosure may also include other optional additives as needed for typical applications. For instance, the water-borne coating composition of the present disclosure is produced using techniques known to those skilled in the art of manufacturing paint or coatings. In addition to the core-shell binder latex, the primary binder latex, the opacifying pigments, the water-borne coating composition may contain conventional additives such as thickeners, coalescing aids, biocides, anti-foaming agents, freeze-thaw additives, and the like. It should also be appreciated that in addition to the opacifying pigment, small amounts of other pigments or colorants may be used to provide desired coloration or to confer other optical effects.

It is generally understood that satin and flat waterborne coating compositions tend to have very little free water, a condition which tends to limit the open time, which refers to the time for which an aqueous coating composition can be exposed to air before skinning, syneresis, or drying occur. The core-shell polymers herein are advantageous to increase the open time of the waterborne coating compositions, in part, because low gloss coatings can be achieved with lower PVC and little to no mineral extenders and additional free-water. Improvement in open time due to the use of the core-shell polymers disclosed herein is beneficial in low VOC compositions having a VOC of about 50 g/l or less. In embodiments, when used in waterborne coating compositions, the core-shell polymers herein can provide an increase in open time as compared to a comparable, conventional coating composition containing mineral extenders or an increased amount of mineral extenders of 10 minutes or more, 20 minutes or more, or 30 minutes or more, as measured according to standard test method ASTM D7488-11 (2016). When used in waterborne coating compositions, the core-shell polymers herein can provide an increase in open time as compared to a comparable, conventional coating composition containing mineral extenders or an increased amount of mineral extenders of up to 20 minutes, up to 30 minutes, or up to 40 minutes, as measured according to standard test method ASTM D7488-11 (2016). In embodiments, when used in waterborne coating compositions, the core-shell polymers herein can provide an increase in open time as compared to a comparable, conventional coating composition containing mineral extenders or an increased amount of mineral extenders of up to 20%, up to 30%, up to 50%, or up to 60%, as measured according to standard test method ASTM D7488-11 (2016).

Glossary of Terms

Additives refer to a general category of components or other raw materials that may be added to the coatings herein to promote various properties. Examples include, but are not limited to, surfactants, defoamers, biocides, mildewcides, algaecides, thickeners, anti-settling agents, pH buffers, corrosion inhibitors, driers, and/or anti-skinning agents.

Glass Transition Temperature or Tg generally refers to a temperature region where an amorphous polymer transitions from a hard, glassy material to a softer, rubbery material. Typically, this transition is reversible. Tg is measured by differential scanning calorimetry (DSC) and/or dynamic mechanical analysis (DMA), such as with a TA Instruments Q200 differential scanning calorimeter or the like instrument. To measure Tg using DSC, a sample deposited on a panel first is baked in a Fisher ISOTEMP™ electric oven for 20 minutes at 149° C. (300° F.) to remove volatile materials. After cooling to room temperature, samples are scraped from the panels, weighed into standard sample pans and analyzed using the standard DSC heat-cool-heat method. The samples were equilibrated at −60° C., then heated at 20° C. per minute to 200° C., cooled to −60° C., and the heated again at 20° C. per minute to 200° C. Glass transitions are calculated from the thermogram of the last heat cycle. The glass transitions are measured at the inflection point of the transition. Preferably, Tg is measured through DSC.

If used herein, Volatile Organic Compound or VOC generally refers to organic compounds that have a high vapor pressure at room temperature. In many cases, VOCs are compounds with a vapor pressure of greater than about 0.1 mm of Hg. VOC as reported herein is measured according to ASTM D2369-90 and is the weight of the VOC per volume of the coating solids in grams/L. As used herein, low VOC or substantially free of VOCs means less than about 50 g/L, in other approaches, less than about 10 g/L, in yet other approaches, less than about 5 g/L, and in yet other approaches, no VOCs.

As used herein, without the need for, without substantial levels of, in the absence of, or substantially free of, substantially none, substantially no, or free-of generally means (unless apparent from the context of the discussion) the coating compositions herein have less than about 1 weight percent, in other approaches, less than about 0.5 weight percent, in other approaches, less than about 0.2 weight percent, and in yet other approaches, none of the particular component or additive. As used herein, essentially free of means no intentionally added amount of an identified material.

When referring to a polymer, oligomer, or copolymer, and a particular monomer or reactant is described, it is also intended that such discussion refers to the resulting monomer unit or associated repeating unit when polymerized within the polymer, oligomer, or copolymer. Likewise, when a monomer unit or repeating unit of a polymer, oligomer, or copolymer is described, the corresponding monomer or reactant is also contemplated by this disclosure. As used herein, the terms polymer or copolymer are interchangeable unless the context of discussion suggests otherwise. A polymer or copolymer typically have a weight average molecular weight above about 40,000 and an oligomer typically has a molecular weight below 500.

As used herein, (meth)acrylate monomer(s) or monomer unit(s) include both acrylate monomer(s) and monomer unit(s) and methacrylate monomer(s) and monomer unit(s) as well as functionalized (meth)acrylate monomer(s) or monomer unit(s) suitable for incorporation into the functionalized polymers or oligomers disclosed herein. Functional moieties may also bear other crosslinking groups, photo-reactive groups, anti-fouling agents, light absorbers, anti-corrosion agents, and the like as needed for a particular application or use.

As used herein, functionalized, functionality, or functional group means a group or moiety of a larger molecule or polymer reactive with another group or atom.

Opacity or hiding (in some approaches) generally refers to the ability of a film to scatter light based on the thickness of the film. The Opacity is often expressed as S/mil and may be in the form of Kubelka-Munk scattering coefficients as determined using a modification of ASTM D 2805-70 as described in J. E. Mchutt and H. L. Ramsay in American Paint and Coatings Journal, April, 1988, p. 46 by the weight drawdown method, which is incorporated herein by reference.

Sheen may also sometimes be referred to as gloss. In a coating, a gloss finish indicates that the surface which has a coating applied to it (i.e., is finished) it is shiny or glass-like. The gloss of a surface is described as the reflection of light from the surface that is independent of color. ASTM D523 may be used to measure sheen. The prescribed angle at which light is reflected off the surface may vary, but for the purposes of this disclosure to measure 85 Sheen, is measured at 85° relative to the surface reflecting the light. ASTM D523 may also be used to describe 60 Gloss, which is measured at 60° relative to the surface reflecting the light. Gloss may also refer to the gloss intensity measured at 20, 60, or 85 degrees and is determined according to ASTM D323. One of skill in the art is able to determine relative levels of gloss (low versus high) in context of each coating.

A coating refers to any decorative or protective layer formed by applying a thin film of a coating composition to a substrate. Coating compositions include any paint, stain, laquers, etc. A coating composition may contain a solvent (which can include a volatile component derived from a petroleum distillate for a solvent-based paint, or a low VOC, or no-VOC, or water for a water-based paint or composition), a binder polymer, and optionally, a pigment, fillers (such as an extender or a plurality of extenders of different sizes) and one or more additives, which may impart different functionality to the paint or final coating.

A paint refers to a coating composition including pigment and film-forming binder that, when applied to form a thin (e.g., approximately 100 µm) wet thickness coating film on a freshly-sanded smooth wood surface will, when dried, hide or substantially hide the wood grain and will present a new surface with its own appearance.

Pigment volume concentration or PVC refers to a number that represents the volume of pigment compared to the volume of all solids. In the field of paints and coatings, PVC is a useful measure because the binder (non-pigment) acts as the material to unite all the pigment and other raw materials into the paint and the PVC value ensures there is enough binder to enable the paint or coating to adhere properly to whatever it has been applied over in addition to containing all of the other components of the paint or coating. If a paint or coating has no pigment at all, it will usually be very glossy and have a PVC of zero. An example is clear gloss paints. Flat paints commonly have a very high pigment loading and have high PVCs (usually in the range from about 55% up to about 80%). Another non-limiting exemplary range of PVC in which pigment can be loaded is from about 60% to about 75%. Primers and undercoats vary from 30% to about 50% PVC as do semi-gloss, satin, and low sheen paints. Additionally, it is thought that the lower the PVC of a paint is, the better its mechanical properties (such as tensile strength, and consequently, exterior durability) will be. PVC may be expressed as a percentage. For example, if a coating has a PVC of 30, then 30% of the total binder/pigment blend is pigment, and 70% is binder solids on a volume basis.

Critical pigment volume concentration or CPVC is the point at which there is just enough binder to wet (entirely surround) the pigment particles. As PVC reaches and then increases above CPVC, mechanical properties of the paint or coating deteriorate. Above CPVC, with insufficient binder to satisfy pigment surface and fill interstitial spaces, air is introduced into the film resulting in a decrease in film integrity. However, above CPVC, increased air and pigment interface results in a substantial boost in pigment scattering efficiency. A film below the CPVC has excess resin and may exhibit a smooth surface that reflects light or appears to be glossy. As the PVC of a film approaches CPVC, the film will appear to be flatter, although the aforementioned loss of mechanical properties may become a limiting factor in how close to CPVC a paint producer wishes to provide the PVC.

Burnish refers to the ability of a coating to retain its gloss value after being subjected to mechanical forces, such as abrasion. Burnish may be measured through ASTM D6736-08.

Refractive Index refers to a measurement that describes how light propagates through a material or medium. If needed, refractive index may be measured through one or more of ASTM D1218, D1747, or D542.

Contrast Ratio is calculated as $Y_{black}/Y_{white}$ and is the ratio of the reflectance of a film on a black substrate to that of an identical film on a white substrate. ASTM D2805-11 provides for the measurement of contrast ratio. $Y_{black}$ represents the reflectance value of a coating and measures the ability of a coating to cover against a black background. $Y_{white}$ represents the reflectance value of a coating and measures the ability of a coating to reflect light against a white background.

Scrub or scrub resistance refers to the ability of the surface of a coating film or paint film to resist being worn away or to maintain its original appearance when rubbed with or against an abrasive surface, typically during cleaning. Scrub resistance can be evaluated through ASTM D2486-96 (Standard Test Method for Scrub Resistance of Wall Paints).

Washability refers to the relative ease of removing dirt, soil, discolorations, and the like, from a dried film applied to a substrate surface, typically an interior architectural surface such as a wall, for example. The soil or dirt is typically removed by washing with abrasive and/or non-abrasive cleaning compositions. To measure washability, a standard test method, ASTM D3450-00 (Standard Test Method for Washability Properties of Interior Architectural Coatings) is used. The terms washability and stain resistance are used interchangeably herein.

Chemical resistance as measured herein is determined through ASTM D1308-02 (2013) relating to the chemical resistance of finishes. Chemical resistance tests performed herein were accomplished by following ASTM D1308-02 (2013) and reporting a rating for each substance tested on a scale of 1 to 5. The following six substances were used for each coating tested: Organic solvents—(1) ethanol, (2) Brake fluid, (3) methyl ethyl ketone ("MEK"); Base—(4) 25% aqueous sodium hydroxide (NaOH); Acids—(5) 10% aqueous acetic acid, and (6) 30% aqueous hydrochloric acid (HCl). The following rating scale was used to assign a rating 1 to 5 based on appearance of a coating applied to a substrate after exposure to a particular chemical, 1 indicating the worst performance and 5 the best: 1—substrate visible, 2—severe color change, rust, blistering, delamination, very soft, 3—slight to moderate blistering, delamination and/or wrinkling, loss of gloss, color change, or slightly soft, 4—very slight change in color and gloss at close inspection but seemingly no change at arm's length, 5—no apparent change in color and gloss, no change in film appearance at close inspection. A coating was ascribed a "good" chemical resistance rating where the sum of the test scores totaled 25 to 30.

Certain terminology is used herein for convenience only and is not to be taken as a limitation on the present disclosure.

EXAMPLES

The following examples demonstrate the preparation of copolymers and waterborne compositions such as those described herein above, as well as non-inventive examples for comparison. The examples are intended to be representative of the polymers that can be made and are not intended to limit the scope of the present disclosure to the specific illustrative examples disclosed below. All percentages, ratios, and amounts in this disclosure and the Examples are by weight unless the context of discussion herein suggests otherwise.

Example 1

A solution of polyvinyl alcohol (PVOH) was prepared as follows: cold water (3336 g) was placed in a 1-gal beaker fitted with overhead stirrer. PVOH powder (117 g) was slowly added into the beaker, and when the formed slurry was homogeneous, it was heated to 80° C. and held for 30 min or until all PVOH is in solution. The mixture was then allowed to cool to room temperature (20° C. to 25° C.) and then 60 mg (each) of each defoamer and biocide were added to the mixture. The resultant mixture had a solids content of about 3.3 to 3.5%, a viscosity of about 15 cps (Brookfield Viscometer DVI), and pH of about 4.8.

Example 2

A coarse pre-emulsion and then emulsion of core monomers was prepared as follows: styrene (1093 g) and divinyl benzene (273 g) were added to a 1-gallon container. Benzoyl peroxide imitator was agitated into to the solution followed by a deformer (0.6 g) and octanol co-surfactant (0.1 g). The previously prepared PVOH solution of Example 1 (1657 g) was then added to the monomer mixture, followed by the solution of sodium bicarbonate. The mixture was agitated for until the coarse emulsion was stable.

This coarse pre-emulsion (1560 g) was homogenized in a 2 L Warren blender, cooled on ice to about 7° C. to about 8° C. and blended at highest speed setting for 30 seconds (2×), while maintaining the temperature below 12° C. and adding defoamers as necessary between blending. The emulsion had a particle size of about 3 to about 12 microns and was stored until used in microsuspension polymerization.

Example 3 (Microsuspension Polymerization)

The stable emulsion of Example 2 was then polymerized forming the core particle of the core-shell polymers (and which was then used as the seed for the second step of shell polymerization). Microsuspension polymerization proceeded as follows: The emulsion was purged with nitrogen for 10 min (add two drops of defoamer as needed to defoam) while heating to 63° C. The temperature was raised to 70° C. and held for 1 hour. Then, the temperature was raised to 80° C. slowly (1° C. at a time) and maintained for 2.5 hours. The batch was cooled to 65° C. and then the chaser package was fed during 60 min and held for 30 min. The resultant latex was filtered, and the pH was adjusted to 6.8 to 7.2 with ammonia. The latex had a solid content 43 to 45%, a weight per gallon of 8.57 lb/gal, and an average particle diameter of about 6.5 to 9 microns.

Example 4 (Core-Shell 1 with a Core/Shell Ratio of 85:15)

A shell was then formed using the latex core particles of Example 3 as follows: to the microsuspension latex 730 g in the reactor from Example 3 was added water, surfactant, and defoamer. A separate pre-emulsion was prepared with shell monomers (22.1 grams of ethylhexyl acrylate, 33.1 grams of methyl methylacrylate, and 1.9 grams of methacrylic acid), water, surfactants and defoamer. The reactor was heated to 65° C. with nitrogen spurge for 10 min and 2 drops of defoamer was added as needed (0.06 g). Then, the temperature was raised to 80° C. gradually and, the pre emulsion and an initiator solution were fed into the reactor for 3 hours with a 30 min hold after the feeds ended. The reactor was cooled to 65° C. to feed the chase solution, which continued for 40 min with a 30 min hold. The pH was adjusted with ammonia. The resulting core-shell latex polymer solution had an average particle diameter of about 12 to about 28 microns, a pH of 6.5 to 7, and a solids content of about 32%. This particle has a core:shell ratio of 85:15.

Example 5 (Core-Shell 2 with a Core/Shell Ratio of 80:20)

A polystyrene-core micosuspension was prepared as in Example 3 with a solid content of 40.7%. A portion of the micro suspension was used in preparation of core-shell latex as follows. To the microsuspension latex 892.4 g in a reactor was added water, surfactant, and defoamer. A separate pre-emulsion was prepared with shell monomers (36.3 grams of ethylhexyl acrylate, 54.3 grams of methyl methylacrylate, and 0.23 grams of methacrylic acid), water, surfactants and defoamer. The reactor was heated to 65° C. with nitrogen spurge for 10 min and 2 drops of defoamer was added as needed (0.06 g). Then, the temperature was raised 80° C. gradually and, the pre emulsion and an initiator solution were fed into the reactor for 3 hours with a 30 min hold after the feeds ended. The reactor was cooled to 65° C. to feed the chase solution, which continued for 40 min with a 30 min hold. The pH was adjusted with ammonia. The resulting core-shell latex polymer solution had an average particle diameter of about 8 to about 28 microns, a pH of 6.5 to 7, and a solids content of about 29%. This core-shell polymer has a core:shell ratio of 80:20.

Example 6

Waterborne coating compositions were prepared using the core-shell polymers of Examples 4 and 5. The two prototypes of core-shell polymers were used in place of typical mineral extenders in several sheens as presented in Table 1. All extenders were removed from the inventive coating formulas while the control included mineral extenders instead of the core-shell polymer of Examples 4 and 5, which had a weight ratio of core:shell of 85:15 and 80:20, respectively. Formulas for the evaluated waterborne coating compositions are provided in Table 1A and results in various bases are provided in Table 1B. Paint or coating bases vary with finishes, such as matte, flat, eggshell, satin, semi-gloss and gloss, and the bases designated as extra white, deep base, ultra-deep generally relates to the color range the paint or coating can be formulated into based on the color desired. As understood, extra white bases are formulated rich in nano scale pigments, and deep bases are formulated poor in nano scale pigments.

Inventive paint or coating formulas including the core-shell polymers performed consistent to the control paint or coating formula within accepted experimental error. From the results of Table 1B it is evident that core-shell latex polymers of the present disclosure had a substantial ability to reduce gloss at a lower PVC than conventional low-gloss paints and maintain performance without the need for mineral extenders.

TABLE 1A

Inventive and Control Paint/Coating Formulations:

| Ingredient | Inventive, Wt. % | Control, Wt. % |
|---|---|---|
| Water | 34.01 | 34.01 |
| Rheology Modifier | 0.50 | 0.50 |
| Biocide | 0.60 | 0.60 |
| Dispersant | 0.59 | 0.59 |
| Surfactant | 0.40 | 0.40 |
| Defoamer | 0.69 | 0.69 |
| Pigment (Titanium Dioxide) | 20.8 | 20.8 |
| Thickener | 2.58 | 2.58 |
| Primary Latex Binder | 29.32 | 31.7 |
| Core Shell Binder latex - Ex 4 or 5 | 9.01 | None |
| Mineral Extender | None | 9.01 |
| Coalescent | 0.99 | 0.99 |
| Fungicide | 0.20 | 0.20 |
| Antimicrobial | 0.21 | 0.21 |
| Neutralizer | 0.10 | 0.10 |

TABLE 1B

Experimental Results:

| Paint | Primary Latex | Tg | Pigment | Extender | PVC | Gloss Air dry 60° | Gloss Air dry 85° | Contrast Ratio | Scrub | Dry Burnish 85 Sheen Initial | Dry Burnish 85 Sheen 25 cycles | Washability Total |
|---|---|---|---|---|---|---|---|---|---|---|---|---|
| Extra White Satin Base | Latex 1 | 10° C., single stage | TiO2 | Mineral | 34.4 | 9 | 11 | 0.969 | 370 | 13 | 15 | 31 |
| | Latex 1 | 10° C., single stage | TiO2 | Core Shell 1 | 20.37 | 16 | 24 | 0.962 | 330 | 24 | 26 | 35 |
| | Latex 1 | 10° C., single stage | TiO2 | Core Shell 2 | 18.04 | 11 | 19 | 0.963 | 280 | 19 | 21 | 35 |
| EX white Flat Base | Latex 1 | 10° C., single stage | TiO2 | Mineral | 44.33 | 3 | 1 | 0.958 | 420 | 1.7 | 2 | 30 |
| | Latex 1 | 10° C., single stage | TiO2 | Core Shell 1 | 18.65 | 6 | 4 | 0.946 | 450 | 3.6 | 3.8 | 28 |
| | Latex 1 | 10° C., single stage | TiO2 | Core Shell 2 | 18.72 | 5 | 3 | 0.942 | 390 | 3.2 | 4.4 | 25 |
| Deep Base Satin Base | Latex 2 | −10 and 90° C. core/shell | TiO2 | Mineral | 10.46 | 11 | 15 | 0.825 | 1010 | 17 | 21 | 29 |
| | Latex 2 | −10 and 90° C. core/shell | TiO2 | Core Shell 1 | 4.21 | 15 | 19 | 0.721 | 1200 | 21 | 25 | 23 |
| | Latex 2 | −10 and 90° C. core/shell | TiO2 | Core Shell 2 | 4.22 | 13 | 20 | 0.711 | 1020 | 23 | 25 | 23 |
| Ultra Deep Flat Base | Latex 3 | −4 and 50° C. core/shell | NA | Mineral | 29.46 | 2 | 2 | 0.062 | NA | 4 | 6 | NA |
| | Latex 3 | −4 and 50° C. core/shell | NA | Core Shell 1 | 18.46 | 5 | 6 | 0.036 | NA | 7 | 9 | NA |
| | Latex 3 | −4 and 50° C. core/shell | NA | Core Shell 2 | 18.05 | 5 | 8 | 0.035 | NA | 8 | 11 | NA |

Note: the chemistry of latex 1 is an acrylic containing fluorinated monomer, Latex 2 is styrene acrylic, and latex 3 is acrylic with crosslinking Example 7

A study was completed to determine the effect of varying the amount of the core-shell polymer in a paint or coating formulation on gloss. Inventive formulations were prepared consistent to inventive sample 1 of Table 1A, but the amount of the core-shell polymer and the primary latex binder were varied to determine the impact of the core-shell polymer on gloss with a consistent PVC. All samples had no mineral extenders. Results are provided in Table 3 below and FIG. 1 that show the dramatic ability of the core-shell polymers to reduce gloss without the need for added mineral extenders at low PVC. FIG. 1 shows the 60°-gloss (closed circle) and 85°-sheen (open circle) on the left y-axis and the PVC (open square) on the right y-axis.

TABLE 3

Paint/coating Evaluations: Dosage effect of core/shell polymer on gloss, using Extra White Flat paint formula

| Core-Shell 85:15 Polymer, % of total resin | Primary Latex All Acrylic Binder, % of total resin | PVC | Gloss, Air dry 60° | Gloss, Air dry 85° |
|---|---|---|---|---|
| 50 | 50 | 24.39 | 2.8 | 1.6 |
| 40 | 60 | 24.17 | 3.3 | 1.8 |
| 30 | 70 | 24.21 | 4.5 | 2.6 |
| 20 | 80 | 24.26 | 7.2 | 5.3 |
| 10 | 90 | 24.34 | 14.6 | 16.8 |

Example 8

A study was completed measuring the improvement in open time using the core/shell latex polymers herein. A satin extra white paint including styrene acrylic primary latex binders with DAAM/ADH crosslinking and mineral extenders was compared to a modified satin extra white paint including a 83/17 (by weight resin solids) blend of the styrene acrylic and the core-shell polymers herein and without mineral extenders. Calculated properties of the compositions are provided in Table 4 and results of an open time study are provided in FIG. 2 with open time measured in minutes.

TABLE 4

| | Control | Core/Shell Sample - Probe |
|---|---|---|
| % NVM | 57.63 | 49.94 |
| % NVV | 40.23 | 35.10 |
| PVC | 35.82 | 22.7*/32.78** |

TABLE 4-continued

| | Control | Core/Shell Sample - Probe |
|---|---|---|
| 60° Gloss | 14 | 16 |
| 85° sheen | 16 | 12 |

*Core/Shell particle as binder
**Core/Shell particle as extender

Unless otherwise specified, all measurements herein are made at 23±1° C. and 50% relative humidity. The dimensions and values disclosed herein are not to be understood as being strictly limited to the exact numerical values recited. Instead, unless otherwise specified, such as dimension is intended to mean both the recited value and a functionally equivalent range surrounding that value. All ranges noted are intended to mean any endpoint within that range. For example, a dimension disclosed as "40 mm" is intended to mean "about 40 mm".

Illustrative embodiments have been described, hereinabove. It will be apparent to those skilled in the art that the above compositions and methods may incorporate changes and modifications without departing from the general scope of this disclosure. It is intended to include all such modifications and alterations within the scope of the present disclosure. Furthermore, to the extent that the term "includes" is used in either the detailed description or the claims, such term is intended to be inclusive in a manner similar to the term "comprising" as "comprising" is interpreted when employed as a transitional word in a claim.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure is to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A waterborne coating composition for producing a matte film, the waterborne coating composition comprising:
   a primary binder latex;
   organic particles having an average diameter of about 10 to about 50 microns and including a polymeric core and polymeric shell, wherein the polymeric core has a glass transition temperature (Tg) of 80° C. or higher and the polymeric shell has a glass transition temperature (Tg) of 30° C. or less;
   a pigment volume concentration (PVC) of about 28 or less; and
   the waterborne coating composition, when dried as the matte film, exhibits a 60-degree gloss value of 5 or less and a 85-degree sheen value of 10 or less and with the polymeric shell combining with the primary binder latex to coalesce as the matte film and the polymeric core remaining as a particle within the dried matte film.

2. The waterborne coating composition of claim 1, wherein the polymeric core is derived from reactants including styrene, methyl styrene, chlorostyrene, vinyl toluene, vinyl naphthalene and divinyl benzene, methyl(meth)acrylate, hexanediol diacrylate, tert-butyl(meth)acrylate, sec-butyl(meth)acrylate, ethylhexyl (meth)acrylate, butyl (meth)acrylate, or combinations thereof.

3. The waterborne coating composition of claim 2, wherein the polymeric shell is derived from reactants including alkyl(meth)acrylates, (meth)acrylic acid, vinyl acetates, acrylamides, alkyl amino (meth)acrylate, allyl (meth)acrylates, di acetone acrylamide, acetoacetyloxy ethyl (meth)acrylate, ethylhexyl(meth)acrylate, or combinations thereof.

4. The waterborne coating composition of claim 1, wherein the polymeric core has an average particle diameter of about 6 to about 9 microns.

5. The waterborne coating composition of claim 4, wherein the organic particles have a weight ratio of the polymeric core to the polymeric shell of about 90:10 to about 60:40.

6. The waterborne coating composition of claim 1, wherein the PVC is about to about 26.

7. The waterborne coating composition of claim 1, wherein the waterborne coating composition includes about 20 to about 40 weight percent of the primary binder latex and about 2 to about 15 weight percent of the organic particles.

8. The waterborne coating composition of claim 7, wherein the waterborne coating composition is essentially free of inorganic extender particles.

9. The waterborne coating composition of claim 1, wherein the polymeric shell has a higher surface tension than a surface tension of the polymeric core.

10. The waterborne coating composition of claim 9, wherein the organic particles have an interface between the polymeric core and the polymeric shell, and the polymeric shell diffuses at least partially into the polymeric core at the interface.

11. The waterborne coating composition of claim 1, wherein the primary binder latex is selected from an acrylic latex, a vinyl acrylic latex, a styrene acrylic latex, or combinations thereof.

12. The waterborne coating composition of claim 1, wherein the Tg of the polymeric core is between about 80° C. to about 100° C. and the Tg of the polymeric shell is about to about 15° C.

\* \* \* \* \*